Sept. 9, 1969  J. M. BOOE  3,466,508
STABILIZATION OF SOLID ELECTROLYTE CAPACITORS
BY MEANS OF ATMOSPHERIC CONTROL
Filed June 21, 1967

INVENTOR.
JAMES M. BOOE
BY
ATTORNEY united States Patent Office 3,466,508
Patented Sept. 9, 1969

3,466,508
STABILIZATION OF SOLID ELECTROLYTE CAPACITORS BY MEANS OF ATMOSPHERIC CONTROL
James M. Booe, Indianapolis, Ind., assignor to P. R. Mallory & Co., Inc., Indianapolis, Ind., a corporation of Delaware
Filed June 21, 1967, Ser. No. 647,693
Int. Cl. H01g 9/00
U.S. Cl. 317—230        13 Claims

ABSTRACT OF THE DISCLOSURE

A solid or dry hermetically closed electrolytic capacitor having sealed within the hermetic enclosure an atmospheric control means for further stabilizing the electrical properties of the capacitor.

---

The present invention relates to hermetically sealed capacitors and more particularly to matter or a composition of matter introduced into the hermetic enclosure for further stabilizing the electrical properties of the capacitors of both the sintered powder type and the foil type. For example, it is known that solid electrolyte capacitors having a porous anode fabricated from a film-forming or anodizable metal such as tantalum, aluminum, niobium, titanium, zirconium, hafnium and the like and having a solid semiconductive electrolyte such as manganese dioxide disposed thereover are sensitive to moisture and acidic gases. The porous anode of the capacitor is permeated by a multiplicity of intercommunicating voids which carry ambient air and hence moisture which adversely affects the electrical properties of the capacitor. The capacitor generally carries contaminants which may evolve acidic gases such as carbon dioxide and moisture when the capacitor is subjected to elevated operational temperatures in excess of 100° C. The evolved acidic gases also adversely affect the electrical properties of the capacitor.

It has been found that capacitors having an anode fabricated from a film-forming metal such as tantalum, and in particular, tantalum capacitors having a low voltage rating and a high capacitance rating, undergo deleterious changes in the electrical characteristics with a change in the humidity of the ambient air. For example, if the humidity of the ambient air increases from an initial humidity, the capacitance and the dissipation factor increase and when the humidity decreases to about its initial value, the capacitance and dissipation factor of the capacitor decrease to substantially their original values. The cause for the variation in the electrical properties of the film-forming anode capacitor is not known, however, it is thought that the semiconductive electrolyte, such as manganese dioxide, does not cover the oxide film dielectric formed on the anode in toto. In such a situation, the capacitor is not utilizing the entire potential capacitance thereof. It is thought that when the moisture content of the ambient air is increased and when this constituent is allowed to come in contact with the surface of the anode and/or permeate the intercommunicating voids of the anode, sufficient electrolyte-like material is formed as a result of combining with carbon dioxide in the air or ionizable material in the anode such as in the semiconductive layer of manganese dioxide to cover additional areas of the tantalum oxide film which are not covered by the manganese dioxide electrolyte thus causing the newly covered areas to exhibit capacitance not exhibited herebefore. It is thought that the additional capacitance found under the newly formed electrolyte-like material causes the increase in the capacitance of the capacitor. In addition, it is thought that the newly formed electrolyte-like material has a high resistivity which causes the capacitor to exhibit an increase in the dissipation factor.

Regardless what the reasons are for the variations in the electrical properties of the capacitor, it has been found that hermetically sealing the capacitance device contributes to the stabilization of the electrical properties of the capacitor. Hermetic sealing is particularly useful where the capacitor device is to be used in an environment subjected to unsettled atmospheric conditions, however, hermetic sealing is not absolute insurance against deleterious variations of the electrical properties of the capacitor at room temperature for various reasons such as incomplete solder or weld joints which were intended to provide hermetic joints and the acidic gases evolved during operation at elevated temperatures in excess of 100° C. Furthermore, the electrical properties of the capacitor become even more unstable if the capacitor is subjected to a combination of humidity and thermal variations.

Additional problems are also encountered during and after the fabrication of the hermetic enclosure. For example, moisture laden air is sealed within the enclosure unless special precautions are taken such as manufacturing in a vacuum-heat or the like type of environment. In addition, there is an invisible film of water carried by the surfaces of the anode and carried by the inner wall or walls of the container which is sealed within the container when the final closure is made. It should be seen the moisture containing air sealed within the unit, the anode and the inner walls of the container become potential sources of moisture. The amount of moisture sealed within the container is a function of temperature and the amount of water vapor or relative humidity of the atmosphere. Hermetically sealed capacitors may contain organic materials which provide insulative protection against vibration and shock, electrically insulate one element from another and the like, and as a binder for metallic particles to form conductive coatings. The organic materials contain potentially deleterious amounts of water absorbed from the air. Using conventional manufacturing techniques to enclose the capacitor results in moisture as water vapor and as absorbed films sealed within the hermetic enclosure. Furthermore, many organic materials undergo gradual degradation upon prolonged exposure to elevated temperatures, such as 1250° C., to yield moisture vapor and acidic gasses. As pointed out hereinbefore, the moisture sealed within the hermetic enclosure will have a deleterious effect on the operation of the capacitor device.

By effectively incorporating a powerful desiccant agent, such as one of the alkaline earth oxides within the hermetic enclosure, substantially all of the water and water vapor contained within the hermetic enclosure will combine with the alkaline earth oxide rendering the ambient air within the hermetic enclosure substantially moisture free. The substantially moisture free enviroment of the hermetic enclosure serves to stabilize the electrical properties of the hermetically sealed capacitor device. It was also found that the desiccant agent absorbed volatile acidic compounds evolved by partial thermal decomposition of the binder in the silver paint on the anode, the solder flux residue, the flux solvent, residual traces of the electroformation electrolyte and the like at elevated operating temperatures.

The alkaline earth oxide desiccants have several properties which are important. Several of the most important of these properties are that they are solid materials rather than liquids, they are electrically nonconductive and remain so even after hydration to the hydroxide, that they are among the most powerful desiccants presently available, that they are alkaline in nature and as such possess the property of sequestering deleterious acidic gases and vapors such as carbon dioxide and that when subjected to elevated temperatures they retain their desiccating property.

Several other types of desiccant agents are known and have proven to be effective at operating temperatures of up to about 65° C. Examples of the several other types of agents are, silica gels, molecular sieves, activated alumina and the like. However, the abovementioned desiccant agents release substantially all of previously absorbed moisture when the hermetically sealed capacitor device containing one of the abovementioned desiccant agents is operated at an operating temperature in excess of about 65° C.

It was found that by introducing a powdered alkaline earth oxide or a substantially uniformly blended mixture of an alkaline earth oxide and a compatible viscous liquid which becomes, upon solidifying, an elastomeric solid into the hermetically sealed enclosure, the electrical properties of the solid electrolyte capacitor were stabilized or the variations thereof were reduced to acceptable value when operated in high humidity and/or in a high temperature environment.

It was found that the semiconductive layer of manganese dioxide and the alkaline earth oxide dispersed in an elastomeric solid had no adverse effect on the physical and the chemical properties of each other. However, if the alkaline earth oxide is dispersed in the elastomeric matrix, it is important that the polymerization reaction thereof should not liberate deleterious amounts of moisture since the liberated moisture will react with the alkaline earth oxide thereby affecting the desiccating property of the desiccant agent. It was found that silicone rubber and silicone potting resins do not liberate water during the polymerization reaction thereof. When silicone rubber is utilized to provide an elastomeric medium for the desiccant, vulcanization is effected by means of an organic peroxide which removes the hydrogen atoms from the methyl groups of adjacent siloxane molecules thus effecting cross-linking at these points. Similarly, when using potting resins and room temperature curing silicone rubber, cross-linking is effected by reacting silane hydroxy groups with methyl triethoxysilane in the presence of a metal organic catalyst such as for example, tribulyltin dilaurate, or platinum compounds.

Therefore, it is an object of the present invention to provide an atmospheric control means that may be easily and conveniently introduced into an hermetic enclosure for a solid electrolyte capacitor without necessitating an alteration of the position of the components within the closure or a modification of the hermetic enclosure.

Another object of the present invention is to provide a desiccant means for an hermetically sealed solid electrolyte capacitor which may physically contact the anode of the capacitor and which does not chemically react with or otherwise deleteriously affect the solid electrolyte formed over the anode of the capacitor.

Another object of the present invention is to provide desiccant means for an hermetically sealed solid electrolyte capacitor that has very high resistivity after absorbing large amounts of moisture, water vapor and acidic gases.

Yet another object of the present invention is to provide a desiccant means for an hermetically sealed solid electrolyte capacitor that does not dehydrate when subjected to operating temperatures as high as 200° C. for periods of time in excess of several thousand hours.

Yet still another object of the present invention is to provide a desiccant means for an hermetically sealed solid electrolyte capacitor having an alkaline earth metal oxide randomly dispersed in an elastomeric matrix or binder that expands with the alkaline earth oxide as the oxide absorbs water vapor or moisture thereby substantially negating possible rupture and/or flaking of the elastomeric matrix or damage to the anode or other members of the construction.

A further object of the present invention is to provide a desiccant means for an hermetically sealed solid electrolyte capacitor having an elastomeric matrix which substantially covers the exposed portions of the anode and fills the void spaces between the anode and the side walls of the hermetic enclosure to thereby sequester moisture and other deleterious gases enclosed within the hermetic enclosure and/or evolved during the operation of the capacitor and protect the anode of the capacitor from possible shock and/or vibration.

Yet another object of the present invention is to provide an elastomeric desiccant means for an hermetically sealed solid electrolyte capacitor wherein the elastomeric matrix retards the rate at which the alkaline earth metal oxide reacts with water vapor, moisture and acidic gases.

A further object of the present invention is to provide an elastomeric desiccant means for an hermetically sealed solid electrolyte capacitor wherein the elastomeric matrix is cast as a liquid into the hermetic enclosure which allows convenient location thereof in the hermetic enclosure and which subsequently polymerizes without releasing moisture or deleterious gases thereby forming an elastomeric solid having dispersed throughout particles of an alkaline earth oxide.

Yet another object of the present invention is to provide a desiccant means for an hermetically sealed solid electrolyte capacitor which does not liberate a gas or gases when water vapor or other deleterious gases react with the desiccant means.

Yet still another object of the present invention is to provide a desiccant means for an hermetically sealed solid electrolyte capacitor which does not liquify and which does not become electrolytic in nature when the desiccant means absorbs moisture and acidic gases.

A further object of the present invention is to provide a desiccant means for an hermetically sealed solid electrolyte capacitor which is simple in construction, reliable, economical to manufacture and lightweight.

The present invention in another of its aspects, relates to the novel features of the instrumentalities of the invention described herein for teaching the principal objects of the invention and to the novel principles employed in the instrumentalities whether or not these principles may be used in the said object and/or in the said field.

With the aforementioned objects enumerated, other objects will be apparent to those persons possessing ordinary skill in the art. Other objects will appear in the following description, appended claims and appended drawings. The invention resides in the novel construction, combination, arrangement and cooperation of elements as hereinafter described and more particularly as defined in the appended claims.

The appended drawings illustrate embodiments of the present invention constructed to function in a most advantageous mode devised for the practical application of the basic principles in the hereinafter described invention.

Generally speaking, the present invention relates to an hermetically sealed solid electrolyte capacitor having an atmospheric control means for further stabilizing the electrical properties of the capacitor. The atmospheric control means is located within the hermetic enclosure and sequesters fluid materials such as water vapor and acidic gases in the container. The atmospheric control means may be a powdered alkaline earth oxide or alkaline earth oxide particles randomly dispersed in an elastomeric matrix. The atmospheric control means may be in intimate contact with the semiconductive layer overlying the oxide film dielectric formed on the anode of the capacitor.

Figure 1:
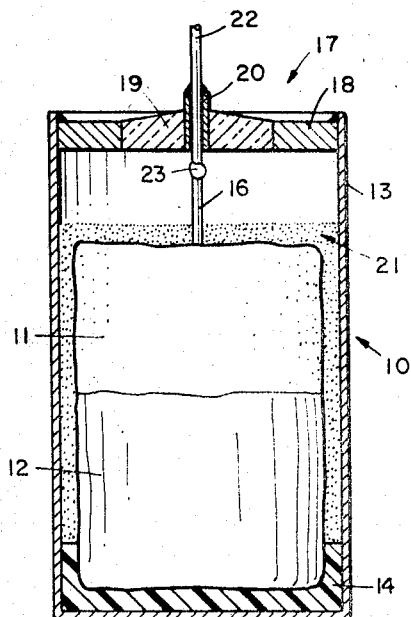
FIGURE 1 is an enlarged partial cross sectional view of an hermetically sealed solid electrolyte capacitor illustrating the anode thereof substantially covered with a powdered alkaline earth metal oxide.

Referring now to the enlarged partial cross sectional view illustrated in FIGURE 1 of the drawing, an hermetically sealed capacitor device is indicated by the reference numeral 10. The hermetically sealed capacitance device includes a sintered, porous pressed powdered metal anode or pellet 11 selected from the group of film-forming or anodizable metals consisting of tantalum, aluminum, niobium and the like. The porous pellet has a multiplicity of intercommunicating voids. During fabrication thereof, the pellet is subjected to anodization or electroformation by passing a direct current from the pellet through an electrolyte through which the pellet is immersed to a tank containing the electrolyte. The voltage applied ranges from about 10–300 volts depending on the thickness of the anodized film desired. The higher the voltage used, the thicker the resulting film and the lower the resulting capacitance. The electrolyte solution may be an aqueous solution of sulfuric acid, nitric acid, phosphoric acid and the like. The pellet is then impregnated with a solution of manganese nitrate, then heated in air for a sufficient length of time and at a sufficient temperature to effect the pyrolytic conversion of the manganese nitrate covering the pellet and permeating the pores to manganese dioxide. A reanodization step may follow each or some of the pyrolysis steps. The reanodization step and the pyrolytic conversion step may be repeated as many times as necessary in order to obtain a pellet having the desired electrical characteristics.

A first conductive coating of colloidal graphite is applied to the manganese dioxide and dried. A second conductive coating such as silver powder in a suitable organic binder to form a paint or other suitable cathode material is applied to the graphite covered surface of the anode by dipping, spraying or the like of the anode with silver paint or the like. The graphite coating and the silver coating serves as a means of coupling the manganese dioxide semiconductive layer to the cathodic terminal of the hermetic enclosure. Since the silver paint coating serves no other purpose than to provide a cathodic termination for the anode, there is no apparent necessity for completely covering the anode with the silver paint although it is recognized that the anode may be completely covered with this or similar material.

A container or can 13 having a closed end and an open end has droplets of solder 14 placed in the closed end of the can sufficient in amount to securely retain the anode 11 therein upon solidification. The anode 11 has its silver paint coated end 12 partially immersed into the molten droplet of solder so as to securely seat the anode in the container in such a manner that the peripheral sides of the anode are substantially equally spaced from the inner wall of the container. The container 13 is fabricated from any suitable solderable cathodic material such as tinned brass or the like. The container 13 may also have attached thereto an axial terminal lead 15 for providing a convenient extension of the cathodic termination of the capacitor.

An anode riser 16 fixedly connected to the anode projects to a point below terminal assembly 17 at which it is welded at 23 to a solderable lead wire 22 generally made of nickel or the like. The open end of container 13 is closed and hermetically sealed by terminal assembly 17. The terminal assembly 17 includes a ring-like means 18 fabricated from tin coated nickel-iron alloy or the like which engages with the inner wall of the open end of container 13, insulating material 19 fabricated from any suitable material such as glass and bonded to metallic ring 18 in a glass-to-metal hermetic seal and a hollow center pin 20 inter-fitting with solderable lead wire 22 so that the lead wire projects through the hollow pin 20 to which it is hermetically soldered thereby providing external anodic termination for the anode 11. The terminal assembly 17 closes the open end of the can 13. The joints between the terminal assembly and the container are formed by welding, soldering or the like so as to provide hermetic joints.

Prior to hermetically sealing, the container 13 has a predetermined amount of a powdered alkaline earth oxide 21 introduced thereinto so as to substantially fill void areas existing between the periphery of the anode 11 and the inner wall of the can 13. The powdered alkaline earth oxide does not affect the physical or chemical properties of the manganese dioxide semiconductive layer or of the silver paint material. The alkaline earth oxide serves the dual function of sequestering moisture and acidic gases evolved from contaminants generally present within the hermetic enclosure from physical handling, the binder for the silver paint on the anode, the solder flux residue, the solder solvent and the like.

Generally, solder is used to provide hermetic joints for the closure and used to securely seat the anode within the container 13, therefore solder flux is used in the soldering operations. During these operations, it is difficult, if not virtually impossible, to prevent solder flux from entering the container and, therefore, from being enclosed therein. It is known that when the hermetically sealed capacitor is subjected to elevated operating temperatures, such as in excess of about 100° C., volatile acidic gases may be evolved by the organic materials and in particular the binder for the silver paint and the solder flux. As disclosed hereinbefore, the evolved organic acid compounds have an adverse effect on the electrical properties of the capacitor. The powdered alkaline earth oxide 21 sequesters and neutralizes the acidic gases and renders said gases inactive. It is seen, therefore, that not only does the powdered alkaline earth desiccant means sequester and retain moisture, but it also sequesters, retains and reduces to an inactive state acidic gases evolved during the operation of the capacitor device. As long as unconverted alkaline earth oxide particles remain within the enclosure the particles will combine with water vapor and acidic gases as each are formed during the operation of the capacitance device.

Figure 2:
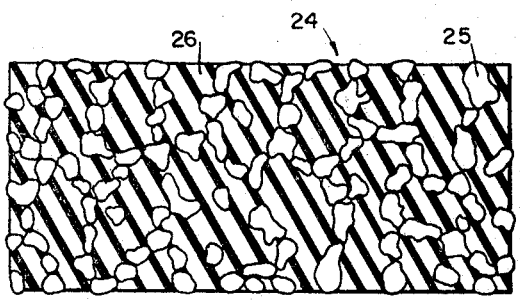
FIGURE 2 is an enlarged cross sectional view of an alkaline earth metal oxide dispersed in an elastomeric solid medium.

FIGURE 2 of the drawing illustrates an enlarged cross-sectional view of an elastomeric desiccant means 24 having alkaline earth metal oxide particles 25 randomly dispersed in an elastomeric matrix 26. The alkaline earth oxide is selected from the group consisting of calcium oxide, strontium oxide and barium oxide. The matrix 12 is selected from elastomers such as the silicone elastomers and more particularly the silicone rubbers, the silicone potting resins and the like. It was found that the matrix should have an elastomeric characteristic so as to substantially prevent flaking and/or rupturing thereof as the alkaline earth oxide expands during absorption of the water vapor and acidic gases. More importantly, a non-elastomeric matrix may rupture the fragile manganese dioxide coating on the anode upon expansion, thereby rendering the capacitor substantially inoperative for its intended purpose.

It was found that the rate at which the water vapor and acidic gases were absorbed by the elastomeric desiccant means was decreased moderately over the rate of the powdered alkaline earth oxide without an elastomer matrix. However, the elastomer matrix did not impair the extent to which the alkaline earth oxide will absorb moisture or acidic gases evolved in the hermetic enclosure. For example, 4.5 grams of barium oxide powder placed in a still air environment having 67 percent relative humidity increased about 6 percent by weight in about 2 hours and increased about 12 percent by weight in about 6 hours. When the same amount of barium oxide powder was dispersed in an elastomeric matrix about a 6 percent by weight increase was registered in about 7.5 hours and about a 12 percent by weight increase was incurred in about 18 hours, thereby showing that the elastomeric matrix does retard the rate at which the alkaline earth oxide absorbs moisture, however, the absorption rate of the elastomeric desiccant means falls within a very useful range.

It was found that about 5-85 percent by weight of the alkaline earth oxide, the remainder an elastomeric matrix provided a satisfactory desiccant means. Less than 5 percent by weight of the alkaline earth oxide the remainder an elastomer matrix provided a desiccant means having less than ideal desiccating capacity in relation to the size of the desiccant means. Exceeding about 80 percent by weight resulted in an elastomeric desiccant means which was frangible and therefore offered no tangible benefits over those derived from using a desiccant in the loose powder form such as shown in FIGURE 1.

A trace to about 1 percent by weight submicron silicon dioxide or other suitable material may be used in the matrix so as to maintain the alkaline earth oxide suspended in the elastomeric matrix when the matrix is in the liquidus phase. A particle size greater than 80 mesh may be used but frequent or continuous agitation of the liquid is required to maintain the oxide dispersed in a reasonably uniform manner throughout the elastomer phase.

Referring again to FIGURE 2, it will be noted that the alkaline earth oxide particles 25 are dispersed in a random fashion throughout the solidified elastomer matrix. If the metal oxide particles are in an abutting relationship as in the case with a loose powder shown in FIGURE 1, the rate of absorption of water vapor and acidic gases is at a rate higher than if the individual particles are dispersed in a matrix as shown in FIGURE 2. A coating of the elastomer film over the individual particles contained within the elastomeric matrix will reduce the transferral of absorbed moisture and acidic gases from a particle exposed to the ambient air and embedded in or carried by the elastomeric matrix. By way of example, the alkaline earth particle at the surface of the desiccant means will initiate absorption of water vapor and acidic gases before an adjacent particle embedded in the matrix will initiate absorption thereof. It is thought that the water vapor and acidic gases absorbed by a surface particle will, to some degree, be transferred to an adjacent particle thereby significantly reducing the rate at which the two particles absorb water vapor and acidic gases when compared to the rate at which the adjacent loose particles absorb water vapor and acidic gases. It is thought that this "chain reaction" phenomenon occurs throughout the elastomeric desiccant means.

Figure 3:
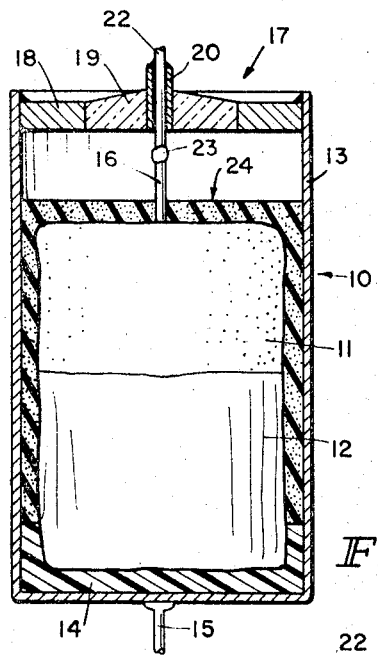
FIGURE 3 is an enlarged partial cross sectional view of an hermetically sealed solid electrolyte capacitor having the anode thereof substantially covered with an elastomeric desiccant means.
Figure 4:
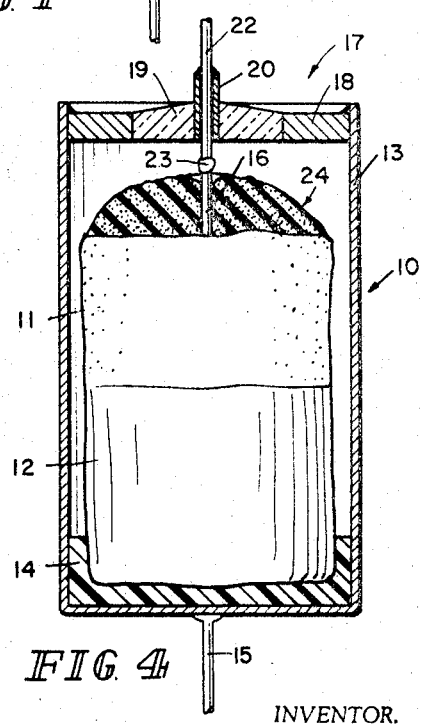
FIGURE 4 is an enlarged partial cross sectional view of an hermetically sealed solid electrolyte capacitor wherein one end of the anode is substantially covered with an elastomeric desiccant means.
Figure 5:
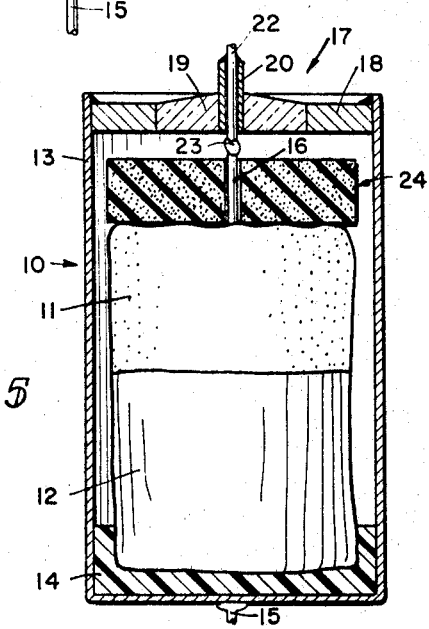
FIGURE 5 shows an enlarged partial cross sectional view of an hermetically healed solid electrolyte capacitor having an axially apertured elastomeric desciccant means wherein the axial aperture inter-fits with the axial terminal of the anode.

FIGURES 3, 4 and 5 of the drawing show substantially the same hermetically sealed capacitor device as shown in FIGURE 1. FIGURE 3 illustrates the pellet or anode 11 substantially surrounded by the elastomeric desiccant means 24 which was introduced into the hermetic enclosure as a liquid and allowed to polymerize therein so as to form an elastomeric solid having substantially the same random dispersion of the oxide particles as shown in enlarged cross-sectional view of FIGURE 2. In addition to absorbing water vapor and acidic gases the elastomiric matrix has the additional function of protecting the anode from shock and/or vibration.

FIGURE 4 shows an end portion substantially covered with the elastomeric matrix which has been trowled or the like thereon in a paste form and allowed to polymerize within the hermetic enclosure such as during the soldering operations.

FIGURE 5 shows an hermetically sealed solid electrolyte capacitor having an axially apertured elastomeric desiccant means 24 wherein the axial aperture thereof inter-fits with the axial therminal riser 16 of the anode 11. The embodiment shown in FIGURE 5 permits the use of pre-formed elastomeric desiccant means with the hermetically sealed capacitance device. It will be recognized by those having ordinary skill in the art that the pre-formed desiccant means may take any one of a number of different configurations and/or shapes. It is seen that as a practical matter the shape of the elastomeric desiccant means is only limited by the confines of the hermetic enclosure in which the elastomeric desiccant is to be used.

The following tables will further serve to exemplify the inventive aspects of the present invention:

Nine hermetically sealed units of 300 mf. and 6 volt rating were obtained similar to the illustration shown in FIGURE 1 except that an alkaline earth oxide was not present in the container. Each capacitor was measured for capacitance (C), and Dissipation Factor (D.F. percent).

TABLE 1

|  | C (mf.) | D.F. (percent) |
|---|---|---|
| Unit No.: | | |
| 1 | 324 | 8 |
| 2 | 329 | 8.2 |
| 3 | 324 | 6.8 |
| 4 | 323 | 7.3 |
| 5 | 325 | 8.2 |
| 6 | 325 | 7.4 |
| 7 | 328 | 8.2 |
| 8 | 320 | 8.2 |
| 9 | 318 | 7.9 |
| Averages | 324 | 7.8 |

All units were perforated by drilling a small hole in the metal container at a point between the anode and the glass seal. The units were stored for four weeks at 100% relative humidity. The following electrical values were observed. It will be noted the capacitance increased markedly. In each of these units a slight decrease in D.F. was experienced.

TABLE 2

|  | C (mf.) | D.F. (percent) |
|---|---|---|
| Unit No.: | | |
| 1 | 415 | 7.9 |
| 2 | 415 | 8.0 |
| 3 | 414 | 5.7 |
| 4 | 410 | 6.6 |
| 5 | 416 | 7.6 |
| 6 | 419 | 6.7 |
| 7 | 415 | 7.4 |
| 8 | 411 | 7.6 |
| 9 | 404 | 7.6 |
| Averages | 413 | 7.2 |

The units were removed from 100% relative humidity and stored for 2 days in normal room environment after which the following electrical measurements were observed. It will be observed the capacitance and D.F. decreased slightly.

TABLE 3

|  | C (mf.) | D.F. (percent) |
|---|---|---|
| Unit No.: | | |
| 1 | 398 | 8.0 |
| 2 | 398 | 6.7 |
| 3 | 398 | 6.0 |
| 4 | 395 | 6.5 |
| 5 | 400 | 7.4 |
| 6 | 402 | 6.7 |
| 7 | 400 | 7.3 |
| 8 | 395 | 7.4 |
| 9 | 388 | 7.1 |
| Averages | 397 | 7.0 |

A desiccant slurry was made by mixing in two parts by weight of barium oxide into 1 part by weight of silicone elastomer potting compound. The slurry was injected into the holes in the cases. Tape was applied around the units to cover the holes. After standing at room temperature for 24 hours the following electrical measurements were observed. It will be observed that the capacitance thereof returned to near normal and the percent D.F. was reduced.

TABLE 4

| Unit No.: | C (mf.) | D.F., percent |
|---|---|---|
| 1 | 332 | 6.0 |
| 2 | 340 | 6.0 |
| 3 | 335 | 4.2 |
| 4 | 330 | 5.4 |
| 5 | 337 | 5.9 |
| 6 | 332 | 5.2 |
| 7 | 332 | 5.5 |
| 8 | 335 | 6.0 |
| 9 | 330 | 6.0 |
| Averages | 333 | 5.6 |

The units were heated at 110° C. for 48 hours then allowed to stand for several days at room temperature. The following electrical measurements were observed. It will be observed the capacitance returned to substantially the original values but the D.F. is much lower than originally measured.

TABLE 5

| Unit No.: | C (mf.) | D.F., percent |
|---|---|---|
| 1 | 332 | 5.1 |
| 2 | 325 | 4.7 |
| 3 | 322 | 4.6 |
| 4 | 321 | 6.0 |
| 5 | 321 | 6.9 |
| 6 | 325 | 3.9 |
| 7 | 327 | 5.3 |
| 8 | 320 | 5.0 |
| 9 | 323 | 5.1 |
| Averages | 324 | 5.2 |

Six units of 40 mf. 10 volt rating were used in the following observations. These units were not solder sealed around the anode wire. The following capacitance and dissipation factor values were found.

TABLE 6

| Unit No.: | C (mf.) | D.F., percent |
|---|---|---|
| 1 | 42.8 | 3.3 |
| 2 | 43.8 | 2.6 |
| 3 | 41.5 | 2.5 |
| 4 | 41.2 | 3.2 |
| 5 | 43.7 | 2.6 |
| 6 | 42.5 | 4.1 |

Barium oxide powder was introduced through the eyelet around the anode lead and then solder closed. During the stand at room temperature they were measured on the 3rd and 8th day after closing and each showed a lowering of the C and D.F. On the 13th day the following values for C and D.F. were found. It will be observed the capacitance and D.F. have stabilized to lower values.

TABLE 7

| Unit No.: | C (mf.) | D.F., percent |
|---|---|---|
| 1 | 36.2 | 1.7 |
| 2 | 38.1 | 1.5 |
| 3 | 36.1 | 1.5 |
| 4 | 37 | 2.7 |
| 5 | 38.5 | 1.6 |
| 6 | 36.8 | 2.5 |

Twenty solid tantalum capacitors of 270 mf. and 6 volt rating having the anode soldered in the metal case were measured for capacitance and dissipation factor (D.F.). Calcium oxide powder was introduced into the assembly around and on the anode. The units were hermetically sealed. The following tables give the values for C and D.F. percent, (1) before adding the calcium oxide, (2) after introducing the calcium oxide and hermetically sealing and allowing to stand at room temperature for 72 hours and (3) after heating for 18 hours at 125° C.

It will be observed the capacitance and D.F. has stabilized to lower values after the 72 hour stand with a slight further reduction in D.F. after the 125° C. treatment. The values are averages of all 20 units.

| | C (mf.) | D.F., percent |
|---|---|---|
| Initial measurements | 347 | 11.9 |
| After 72 hours R.T. with CaO | 283 | 5.14 |
| After 18 hours at 125° C | 283 | 5.05 |

In another test 32 solid tantalum capacitors were used for tests. These units were rated at 270 mf. and 6 volts. Sixteen of the units used for controls were assembled in the usual manner in that the anodes were soldered in the cases in normal room environment and the glass-to-metal seal terminal assemblies were soldered in place at substantially the same time, however, the units were not hermetically sealed at this point in that the lead wire was not soldered to the tube in the glass seal. This was done in the conventional manner in a dry box in order to replace any moist air in the units with dry air.

The 16 test units from the same lot were assembled in the following manner. After the anodes were soldered in the cases, a small amount of elastomeric desiccant, in the liquid form, comprised of two parts by weight of barium oxide and one part by weight of a silicone casting resin, was injected into the units on the anodes. After this the glass-to-metal seals were put in place and the units were hermetically sealed by soldering. The units were heated at 125° C. for 18 hours to convert the desiccant composition to the elastomeric condition and to liberate any moisture from the anodes and transfer same to the desiccant.

Both the 16 control units and the 16 test units were subjected to the following tests.

(1) Measured initially at room temperature.
(2) Measured initially at 125° C.
(3) Measured at 125° C. after 250 hours operation at 125° C.
(4) Remeasured at room temperature after the 250 hour operation.

From the results given below, it will be observed that although the capacitance change from the initial to the final room temperature values was only slightly higher in the control units than in the test units, the capacitance change from room temperature to 125° C. (ΔC. temp.) and the capacitance change during life at 125° C. (ΔC. operation) was much greater in the controls than in the test units. The following values are averages of the C and percent D.F. and ΔC. of the 16 control and 16 feet units.

| Control Units | | | | | | | | Test Units | | | | | | | |
|---|---|---|---|---|---|---|---|---|---|---|---|---|---|---|---|
| Initial R.T. values | | Initial 125° C. values | | Final 125° C. values (250 hrs.) | | Final R.T. values | | Initial R.T. values | | Initial 125° C. values | | Final 125° C. values (250 hrs.) | | Final R.T. values | |
| C (mf.) | D.F., percent | C (mf.) | ΔC. Temp., percent | C (mf.) | ΔC. Life, percent | C (mf.) | ΔC., percent | C (mf.) | D.F., percent | C (mf.) | ΔC. Temp., percent | C (mf.) | ΔC. Life, percent | C (mf.) | ΔC., percent |
| 261 | 4.21 | 305 | +16.8 | 287 | −6.0 | 254 | −2.6 | 260 | 2.98 | 270 | +3.8 | 265 | −1.8 | 254 | −2.3 |

The present invention is not intended to be limited to the disclosure herein and changes and modifications may be made in the disclosure by those skilled in the art without departing from the spirit and the scope of the novel concepts of this invention. Such modifications and variations are considered to be within the purview and the scope of this invention and the appended claims.

Having thus described my invention, I claim:

1. An hermetically sealed solid electrolyte capacitor having atmospheric control means comprising: a container having a closed end and an open end, an anode with a terminal riser disposed in said container, a dielectric film covering the surface of said anode, a semiconductive layer overlying said dielectric film, a cathode terminal extending from said container, an electrically conductive cathode layer disposed over said semiconductor layer and electrically connected to said cathode terminal, said cathode layer comprising at least in part an atmospheric control means for sequestering water vapor and acidic gases in said container, a terminal assembly hermetically enclosing the open end of said container and an anode terminal structure sealingly extending through said assembly.

2. An hermetically sealed solid electrolyte capacitor having atmospheric control means as claimed in claim 1, wherein said atmospheric control means is a powdered alkaline earth oxide.

3. An hermetically sealed solid electrolyte capacitor having atmospheric control means as claimed in claim 1, wherein said atmospheric control means is a powdered metal oxide desiccant agent selected from the group consisting of barium oxide, calcium oxide and strontium oxide.

4. An hermetically sealed solid electrolyte capacitor having atmospheric control means as claimed in claim 1, wherein said atmospheric control means includes moisture and acidic gas absorbing particles randomly dispersed in an expandible matrix.

5. An hermetically sealed solid electrolyte capacitor having atmospheric control means as claimed in claim 1, wherein said atmospheric control means includes metal oxide particles selected from the group consisting of barium oxide, strontium oxide and calcium oxide dispersed in an elastomeric matrix.

6. An hermetically sealed solid electrolyte capacitor having atmospheric control means as claimed in claim 5, wherein said elastomeric matrix is a siloxane elastomer.

7. An hermetically sealed solid electrolyte capacitor having atmospheric control means as claimed in claim 5, wherein said atmospheric control means includes about 5-80 percent, by weight, of said alkaline metal oxide particles and the remainder said elastomeric matrix.

8. An hermetically sealed solid electrolyte capacitor having atmospheric control means as claimed in claim 5, wherein said alkaline earth oxide particles have a particle size of about 80 mesh or finer.

9. An hermetically sealed solid electrolyte capacitor having atmospheric control means as claimed in claim 5, wherein said elastomeric matrix is selected from the group consisting of the silicone potting resins and silicone rubbers.

10. An hermetically sealed solid electrolyte capacitor having atmospheric control means as claimed in claim 5, wherein said atmospheric control means substantially fills the void area between said side wall of said container and said anode thereby further providing support for said anode.

11. An hermetically sealed solid electrolyte capacitor having atmospheric control means as claimed in claim 5, wherein said atmospheric control means includes an axial aperture which inter-fits with said terminal riser of said anode.

12. An hermetically sealed solid electrolyte capacitor having atmospheric control means as claimed in claim 11, wherein said atmospheric control means surrounds said anode riser in contact with said cathode layer and is substantially ring-like shaped.

13. An hermetically sealed solid electrolyte capacitor having atmospheric control means as claimed in claim 12, wherein said atmospheric control means is substantially a solid mass.

References Cited

UNITED STATES PATENTS

| | | | |
|---|---|---|---|
| 1,764,770 | 6/1930 | André | 317—233 |
| 1,830,501 | 11/1931 | André | 317—233 |
| 3,036,249 | 2/1962 | Hall | 317—230 |
| 3,297,918 | 1/1967 | Booe | 317—230 |

JAMES D. KALLAM, Primary Examiner

U.S. Cl. X.R.

29—571; 317—258